United States Patent [19]

Fontana

[11] 4,348,784
[45] Sep. 14, 1982

[54] SWIVEL TYPE CASTER WITH SEAL AND LUBRICATION RING

[75] Inventor: Frank J. Fontana, Stratford, Conn.

[73] Assignee: Stewart-Warner Corporation, Chicago, Ill.

[21] Appl. No.: 161,861

[22] Filed: Jun. 23, 1980

[51] Int. Cl.³ .............................................. B60B 33/00
[52] U.S. Cl. .......................................... 16/36; 16/21; 16/26
[58] Field of Search ............................... 16/21, 26, 36

[56] References Cited

U.S. PATENT DOCUMENTS

| | | | |
|---|---|---|---|
| 1,884,142 | 10/1932 | Noelting | 16/21 |
| 2,188,648 | 1/1940 | Bouvier et al. | 16/35 |
| 2,478,035 | 8/1949 | Babcock | 16/21 |
| 2,787,804 | 4/1957 | Noelting et al. | 16/36 |
| 3,479,680 | 11/1969 | Clinton et al. | 16/21 |
| 4,097,954 | 7/1978 | Christensen | 16/21 |

Primary Examiner—Doris L. Troutman
Attorney, Agent, or Firm—Augustus G. Douvas

[57] ABSTRACT

A swivel caster of the type having an inverted U-shaped horn member with a cup-shaped upper portion that rotatably receives a swivel plate adapted for connection to the underside of the supported article. A thrust bearing is provided including an annular array of ball bearings that are seated in adjacent semi-toroidal recesses in the bottom of the swivel plate and the top of the horn member. The area around the ball bearings is sealed by an integral plastic seal and lubrication ring that has an upper frusto-toroidal surface engaging and sealing the swivel plate and a lower frusto-toroidal surface engaging and sealing the horn member. The ring has an integral outwardly extending cylindrical projection that defines a lubrication fitting with a small radial bore extending therethrough and communicating with the interior of the ring to supply lubricant from a source to the bearing.

10 Claims, 5 Drawing Figures

SWIVEL TYPE CASTER WITH SEAL AND LUBRICATION RING

BACKGROUND OF THE PRESENT INVENTION

The present invention relates to caster assemblies and more particularly to the type of caster having a swivel plate mounted on the upper surface of a wheel carrying horn member. Casters of this type are used extensively in heavier load applications such as supporting work dollies, pallets and scaffolding equipment. In heavier load applications an axial thrust bearing, such as a ball-bearing assembly, is provided between the swivel plate and the upper surface of the horn to reduce the frictional resistance to swivelling motion and to distribute the load evenly to the horn from the supported equipment. It is desirable that these bearings be adequately lubricated during the life of the caster and toward this end, a nipple-type metal lubrication fitting is frequently provided on the underside of the horn along with a seal in the space between the swivel plate and the horn member to prevent excessive lubricant escape.

The disadvantage in this prior lubrication arrangement, in addition to its high cost of manufacture, is that it is necessary to turn the entire article supported on the casters over to obtain access to the lubrication fitting with a conventional pressurized lubricant valve or gun.

It is a primary object of the present invention to ameliorate the problems described above in swivel plate type casters having pressurized bearing lubrication.

SUMMARY OF THE PRESENT INVENTION

In accordance with the present invention, an integral seal and lubrication ring is provided for a swivel plate type caster that combines the heretofore separate lubrication fitting and sealing functions into a single element that is readily accessible to receive a high pressure lubricant gun without the necessity to maneuver the caster assembly or the equipment supported on the caster.

Toward this end, the caster assembly includes an inverted generally U-shaped horn member that supports a wheel for rotation, that has a cup-shaped upper portion with a semi-toroidal recess that receives large ball-bearings also received in a mating semi-toroidal recess in the lower surface of a round or square swivel plate adapted to be fastened to the under portion of the article or equipment to be supported. The swivel plate is axially fixed to the cup-shaped upper portion of the horn member by a central pin fixed thereto that extends through the horn member and carries a secondary bearing member on the underside of the horn member having an annular array of smaller ball bearings engaging the underside of the cup-shaped horn portion.

The seal and lubrication ring is a one-piece plastic molding constructed of a polyethylene, vinyl or acetate copolymer having a Shore durometer of approximately 95. The ring has a lower curved frusto-toroidal surface that engages and seals a complementary surface on the lower side of the swivel plate. The lubrication fitting is a radially extending cylindrical projection formed integrally with the ring that has a frusto-conical inwardly extending bore that communicates with a narrow straight bore that opens to the inner surface of the ring and extends between the swivel plate and the horn member to provide access to the area between the plate and the horn member where the large ball bearings are located.

The location of the radially extending lubricating fitting projection on the ring permits the bearings to be lubricated with a conventional lubrication gun without maneuvering the caster assembly or the article supported thereby in any way. The one-piece seal and lubrication fitting eliminate the requirement for a separate lubrication fitting, such as the above-noted prior art location of the lube fitting on the underside of the horn member. Moreover, the cost of the combination of the lubrication fitting and the seal ring in a one-piece plastic molding is significantly less than manufacturing and assembly costs for the separate seal and lubrication fittings heretofore known in the prior art.

DETAILED DESCRIPTION OF THE PREFERRED EMBODIMENT

Figure 1:
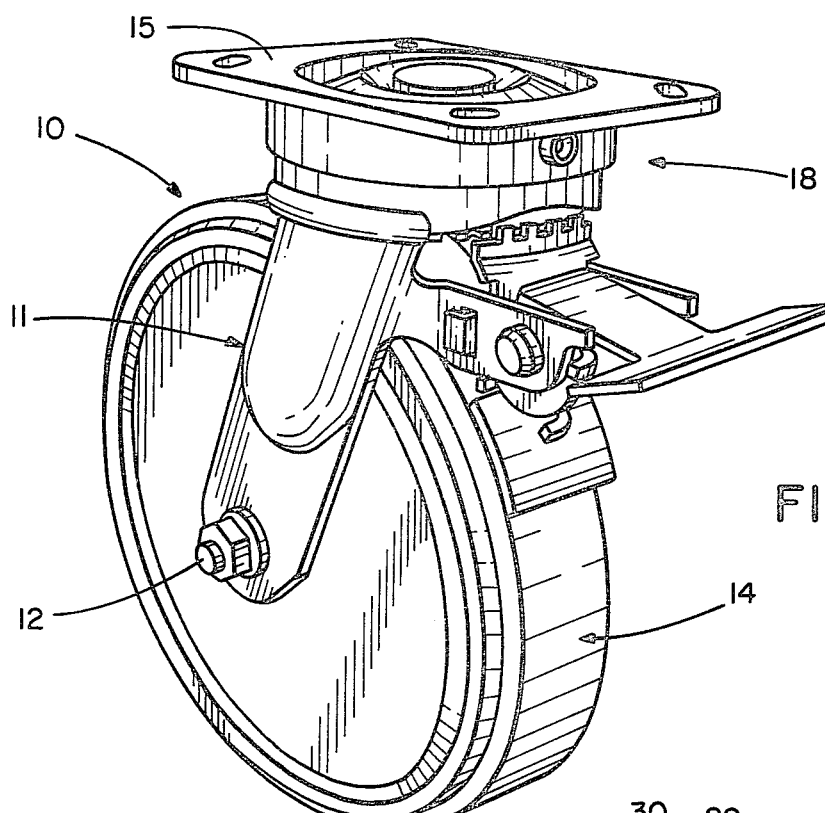
FIG. 1 is a perspective view of a swivel type caster assembly according to the present invention.
Figure 2:
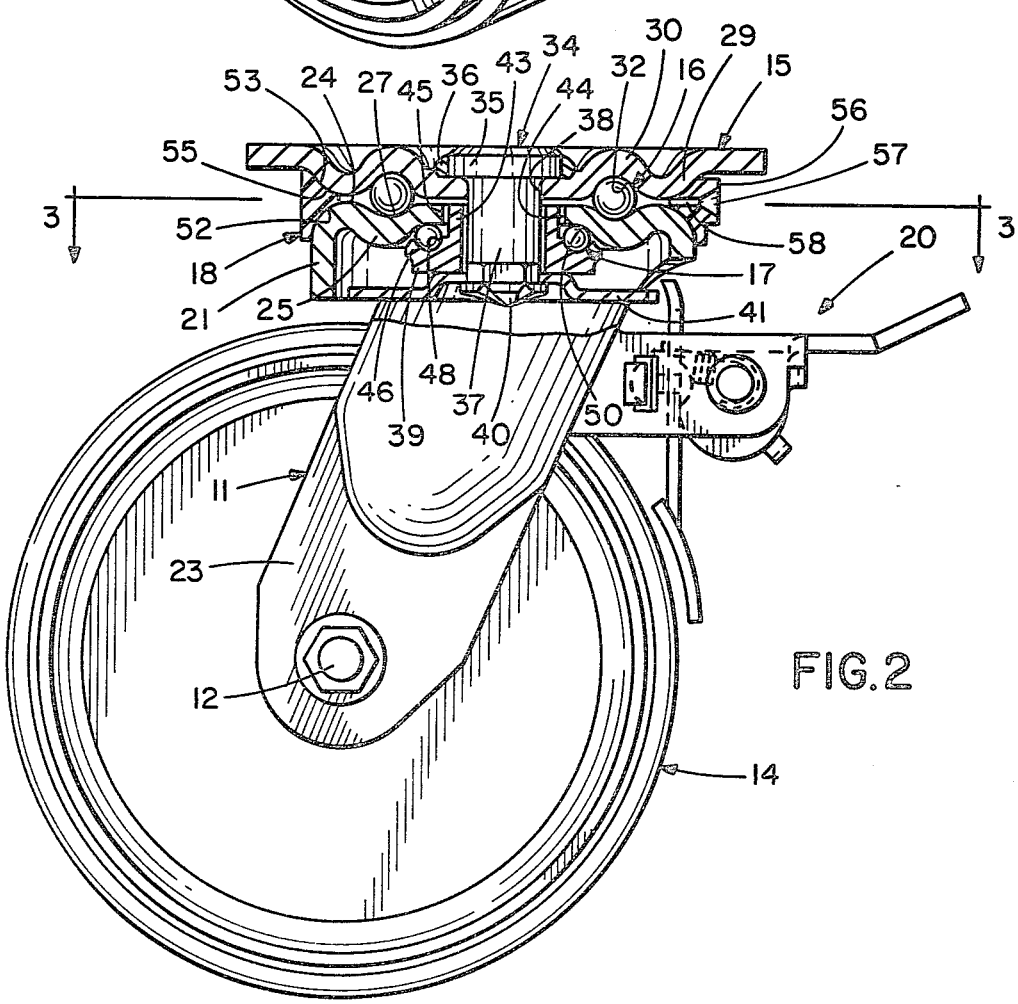
FIG. 2 is a side view, partly in cross-section, of the caster assembly illustrated in FIG. 1.
Figure 3:
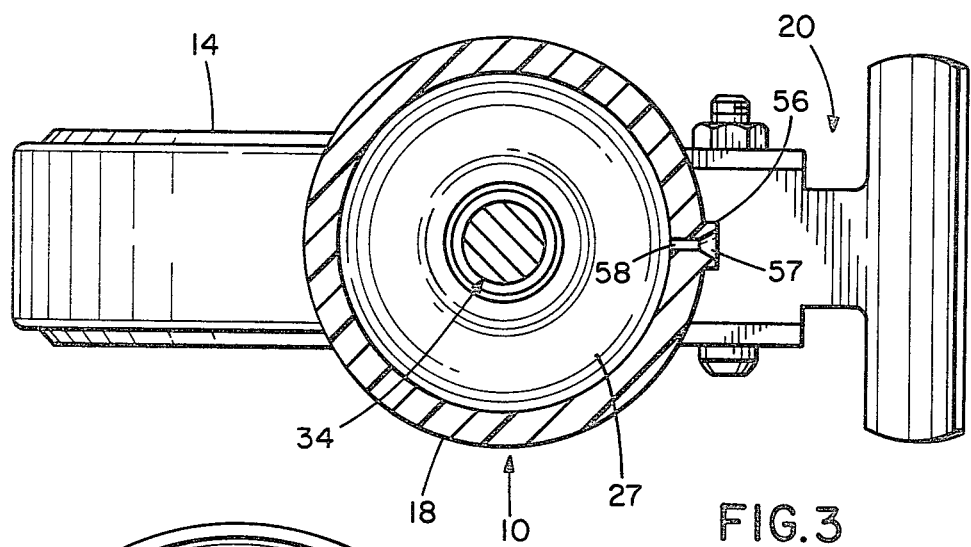
FIG. 3 is a cross-section of the caster assembly taken generally along line 3—3 of FIG. 2.
Figure 4:
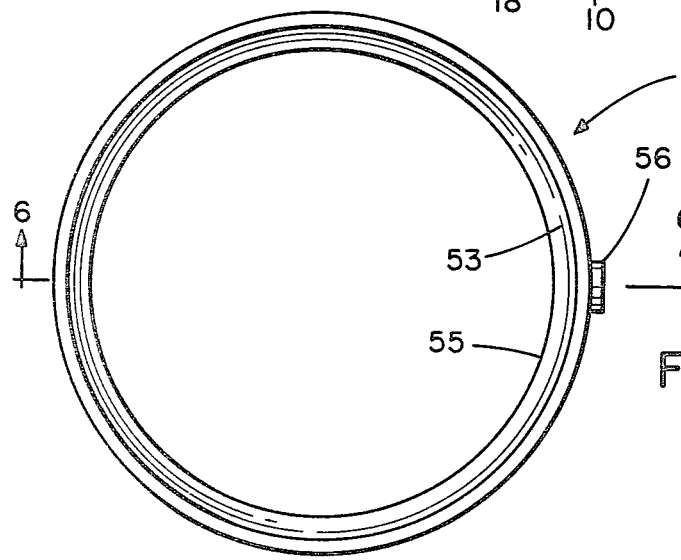
FIG. 4 is an enlarged top view of the seal and lubrication ring subassembly.

Viewing the drawings and particularly FIGS. 1 to 3, a caster assembly 10 is provided according to the present invention, of the swivel plate type which is seen to generally include an inverted generally U-shaped horn member 11 carrying an axle 12 that supports a soft treaded wheel 14 for rotation. A swivel plate 15 is rotatably mounted on top of the horn with opposed sets of ball bearings 16 and 17, and the area between the swivel plate and the horn is sealed by a one-piece seal and lubrication ring 18.

A combined swivel lock and brake assembly 20 forms no part of the present invention and is described in more detail in my copending application entitled "Caster Assembly with Swivel Lock and Brake", Ser. No. 167,680, filed July 11, 1980 and assigned to the assignee of the present invention.

The horn member 11 is constructed of a heavy metal stamping that includes a cup-shaped upper porton 21 and integral spaced leg portions 23 that receive and retain the axle 12 in position. The cup-shaped portion 21 has an outer downwardly opening semi-toroidal section 24 connected to an upwardly opening inner semi-toroidal section or portion 25 that define a semi-toroidal surface 27 that receives and retains the large ball bearings 16 in position without the need for a separate bearing race.

The swivel plate 15 is also a heavy metal stamping that may be either circular or rectangular in outer configuration, although it is shown as being rectangular in FIG. 1 of the drawings. Swivel plate 15 has an outer upwardly opening semi-toroidal portion 29 connected to a downwardly opening inner semi-toroidal portion 30 that define a semi-toroidal recess 32 complementary to the recess 27 in the horn member 11, that also receives and assists in retaining the ball bearings 16 in position. The ball bearings 16 are sized such that they carry the entire downward load on the caster, and the swivel plate 15 remains spaced from the upper surface of the horn member 11 even under load.

The swivel plate 15 is axially fixed to the horn portion 21 by a kingpin 34 having a head 35 that is welded as at 36 to the upper portion of the swivel plate 15 and has a shank portion 37 that extends through central bore 38, through bore 44 in horn portion 21, and through a secondary bearing member 39 mounted beneath the horn portion 21. The lower end of pin 34 is deformed as at 40, staking a swivel lock plate 41, bearing member 39 and swivel plate 15 together as a unit for rotational movement on and with respect to the horn portion 21.

The secondary bearing member 39 is annular in configuration and has an upwardly extending sleeve portion 43 that extends into central opening 44 in the horn member and is spaced from this central horn opening leaving an annular passageway 45, permitting lubricant to flow from the area around the ball bearings 16 to the area of the secondary ball bearings 17. The bearing member 39 has an enlarged lower portion 46 that has a semi-toroidal groove or recess 48 that retains the secondary bearings 17 in position against a bearing surface 50 on the lower side of the cup-shaped portion 21 of the horn adjacent semi-toroidal portion 25 thereof. Bearing member 39, along with bearings 17, define an axial thrust bearing resisting upward and tilting loads on the caster swivel plate 15.

The lubrication fitting and seal ring 18 seals the area between the swivel plate 15 and the horn member portion 21 and is also adapted to receive a conventional lubrication valve for injecting heavy lubricant to the ball bearings 16 and also to the ball bearings 17. Ring 18 is a one-piece plastic molding and plastics found suitable for this purpose include polyethylene, vinyl or acetate copolymers having a Shore hardness durometer of approximately 95. Ring 18 has a lower frusto-toroidal surface 52 that engages and seals the complementary surface on horn portion 24, and an upper frusto-toroidal surface 53 that engages and seals against the semi-toroidal surface of portion 29 on the swivel plate 15. The frusto-toroidal surfaces 52 and 53 form an annular lip 55 that fits between the swivel plate 15 and the top of the horn member portion 21 to tightly seal the area around the ball bearing 16, and the location provides increased sealing capability as the downward axial loads on the swivel plate 15 increase.

Figure 6:
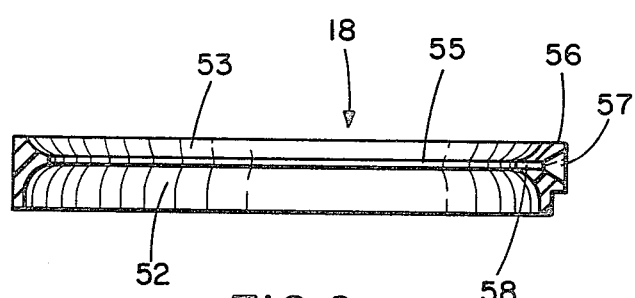
FIG. 6 is a cross-section of the seal and lubrication ring taken generally along line 6—6 of FIG. 4.
Figure 5:
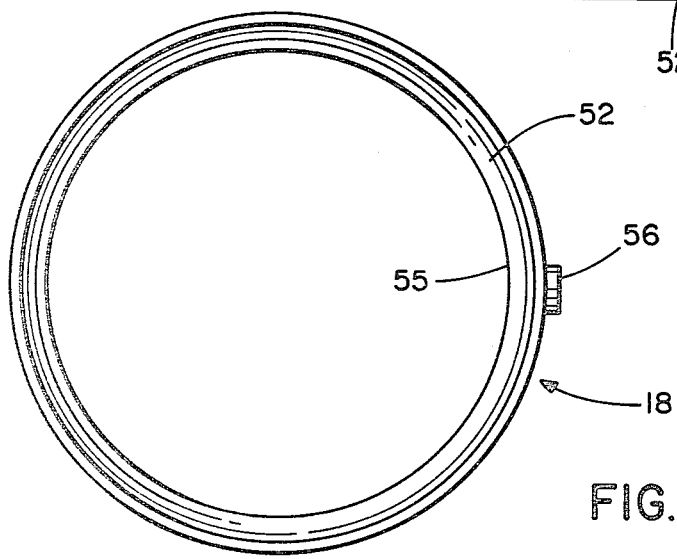
FIG. 5 is a bottom view of the seal and lubrication ring illustrated in FIG. 4.

The lubrication fitting includes an integral cylindrical radially outwardly extending projection 56 on ring 18 having a frusto-conical bore 57 therein communicating with a narrow straight bore 58 that opens to the inside of ring 18 between the swivel plate 15 and the horn member portion 21 at annular lip 55 as seen best in FIGS. 2, 3 and 6.

The location of the lubrication fitting projection 56 permits a lubricant control valve or grease gun to be placed over this projection with a conventional coupling and lubricant injected through the bores 57 and 58 into the area of ball bearings 16. Some of this lubricant also passes inwardly between the plate 15 and the horn member portion 21 from the ball bearings 16, downwardly through annular recess 45 to the ball bearings 17 and in this manner lubrication of both bearings 16 and 17 may be effected from a single lubricant fitting projection 56.

What is claimed is:

1. A swivel type caster assembly, comprising; horm means carrying an axle, a wheel mounted on the axle for rotation, said horn means having an upper bearing surface, a swivel plate mounted for rotation adjacent said horn means bearing surface, pin means interconnecting the swivel plate and the horn means, a plurality of ball bearings in annular array between the swivel plate and the horn means bearing surface, and a non-metallic seal surrounding and engaging the swivel plate and the horn means to prevent the escape of lubricant from the area of the ball bearings, said seal having a generally radially outwardly extending lubrication fitting communicating with said area.

2. A swivel type caster assembly as defined in claim 1, wherein said seal and lubrication fitting are a one-piece plastic molding.

3. A swivel type caster assembly as defined in claim 1, wherein the upper portion of the horn means has an outer semi-toroidal surface and a connecting inner reversed semi-toroidal surface together defining said bearing surface, said swivel plate having an outer semi-toroidal surface and a connecting reversed semi-toroidal surface together defining a swivel plate bearing surface, said ball bearings engaging said bearing surfaces, said seal having a first frusto-toroidal surface engaging and sealing said horn means outside semi-toroidal surface, and a second frusto-toroidal surface engaging and sealing the swivel plate outer semi-toroidal surface.

4. A swivel type caster assembly as defined in claim 1, wherein said seal is a one-piece annular plastic molding, said lubrication fitting being integral with the seal molding and including a small radial bore extending outwardly from the inner surface of the annular molding, said small bore communicating with a frusto-conical bore extending to the outer surface of the annular molding, and said lubrication fitting including an integral cylindrical projection on the outer surface of the annular molding.

5. A swivel type caster assembly, comprising; a generally inverted U-shaped horn member carrying an axle, a wheel mounted for rotation on said axle, said horn member having an annular bearing surface on the upper portion thereof and a bearing surface on the lower portion thereof, a plurality of ball bearings on the upper bearing surface, a swivel plate mounted for rotational movement above the horn member and having an annular bearing surface receiving the ball bearings, a bearing member beneath the upper portion and engaging said lower bearing surface, a fastener fixed to the swivel plate extending through the upper portion of the horn member and fixed to the bearing member to position and retain the swivel plate axially in both directions, and a non-metallic seal ring surrounding and engaging the swivel plate and the horn member to seal lubricant in the area of the ball bearings, said seal ring having an integral lubrication fitting extending generally radially outwardly therefrom, said lubrication fitting including a radial bore through said seal ring communicating with the area of the ball bearings.

6. A swivel type caster assembly as defined in claim 5, wherein said seal ring is a one-piece plastic molding, and said lubricating fitting includes an integral radial projection extending outwardly from said ring.

7. A swivel type caster assembly as defined in claim 6, wherein said seal ring plastic molding has a first frusto-toroidal surface engaging and sealing the horn member and an adjacent frusto-toroidal surface engaging and sealing the swivel plate.

8. A swivel type caster assembly as defined in claim 7, wherein said radial bore includes a first straight narrow bore opening on the inside of the seal ring communicating with a frusto-conical bore opening to the outer surface of the seal ring.

9. A swivel type caster assembly as defined in claim 5, includng a second set of ball bearings in annular array between the bearing member and the lower bearing surface on the horn member upper portion.

10. A swivel type caster, comprising; an inverted generally U-shaped horn member having a generally cup-shaped upper portion and spaced generally downwardly extending leg portions, an axle extending between and mounted in the leg portions, a wheel on the axle mounted for rotation, said horn member upper portion having a downwardly opening semi-toroidal outer portion and an inner upwardly opening semi-toroidal portion defining an upper bearing surface, a plurality of ball bearings seated in said bearing surface, a swivel plate mounted for rotation above the upper portion of the horn member and having a downwardly opening semi-toroidal portion congruent with the inner semi-toroidal portion of the horn member upper portion and defining a second bearing surface for the ball bearings, a bearing member mounted for rotation beneath the upper portion of the horn member and having bearing engagement therewith, a central pin fixed to the swivel plate extending freely through the upper portion of the horn member and fixed to the bearing member to maintain the axial position of the swivel plate with respect to the horn member in both directions, and an integral one-piece annular seal ring and lubrication fitting surrounding and engaging the swivel plate and the upper portion of the horn member, said seal ring having an inner lower frusto-toroidal surface engaging and sealing the outer semi-toroidal surface on the upper portion of the horn member and an inner upper second frusto-toroidal surface engaging and sealing the swivel plate, said ring having a cylindrical integral projection defining part of a lubrication fitting, a small radial bore aligned with the projection opening to the inner surface of the ring, said radial bore communicating with a frusto-conical bore opening to the outer surface of the ring from the cylindrical projection.

* * * * *